US008524794B2

(12) United States Patent  (10) Patent No.: US 8,524,794 B2
Muller et al.  (45) Date of Patent: Sep. 3, 2013

(54) HYDROPHILIC MEMBRANES

(75) Inventors: Heinz-Joachim Muller, Thornleigh (AU); Daniel Mullette, Toongabbie (AU)

(73) Assignee: Siemens Industry, Inc., Alpharetta, GA (US)

(*) Notice: Subject to any disclaimer, the term of this patent is extended or adjusted under 35 U.S.C. 154(b) by 701 days.

(21) Appl. No.: 11/571,101

(22) PCT Filed: Jul. 4, 2005

(86) PCT No.: PCT/AU2005/000975
§ 371 (c)(1),
(2), (4) Date: Dec. 21, 2006

(87) PCT Pub. No.: WO2006/002479
PCT Pub. Date: Jan. 12, 2006

(65) Prior Publication Data
US 2008/0058440 A1    Mar. 6, 2008

(30) Foreign Application Priority Data

Jul. 5, 2004 (AU) ................. 2004903680
Apr. 6, 2005 (AU) ................. 2005901689

(51) Int. Cl.
*C08L 27/22* (2006.01)
(52) U.S. Cl.
USPC ........... 522/109; 522/112; 522/152; 522/156; 525/199; 525/73; 525/191; 525/375; 525/195; 525/203
(58) Field of Classification Search
USPC ............... 522/109, 110, 149, 112, 152, 156; 96/13; 95/45, 50, 52, 54; 210/651, 500.21, 210/500.28, 500.23, 500.27, 500.42; 427/245; 264/177.14; 525/199, 73, 191, 375, 195, 525/203
See application file for complete search history.

(56) References Cited

U.S. PATENT DOCUMENTS

| | | |
|---|---|---|
| 1,994,135 A | 3/1935 | Horowitz |
| 2,658,045 A | 11/1953 | Schildknecht |
| 3,216,983 A | 11/1965 | Levenson |
| 3,228,876 A | 1/1966 | Mahon |
| 3,275,554 A * | 9/1966 | Wagenaar .................... 508/558 |
| 3,373,056 A | 3/1968 | Martin |
| 3,435,893 A | 4/1969 | Withers |
| 3,494,780 A | 2/1970 | Skiens |
| 3,556,305 A | 1/1971 | Shorr |
| 3,625,827 A | 12/1971 | Wildi et al. |
| 3,654,147 A | 4/1972 | Levin et al. |
| 3,693,406 A | 9/1972 | Tobin, III |
| 3,708,071 A | 1/1973 | Crowley |
| 3,728,256 A | 4/1973 | Cooper |
| 3,864,289 A | 2/1975 | Rendall |
| 3,876,738 A | 4/1975 | Marinaccio et al. |
| 3,886,066 A | 5/1975 | Chen et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,033,817 A | 7/1977 | Gregor |
| 4,142,526 A | 3/1979 | Zaffaroni et al. |
| 4,188,817 A | 2/1980 | Steigelmann |
| 4,192,750 A | 3/1980 | Elfes et al. |
| 4,193,780 A | 3/1980 | Cotton, Jr. et al. |
| 4,203,848 A | 5/1980 | Grandine, II |
| 4,218,324 A | 8/1980 | Hartmann et al. |
| 4,230,583 A | 10/1980 | Chiolle et al. |
| 4,247,498 A | 1/1981 | Castro |
| 4,248,648 A | 2/1981 | Kopp |
| 4,253,936 A | 3/1981 | Leysen et al. |
| 4,278,548 A | 7/1981 | Bettinger et al. |
| 4,302,336 A | 11/1981 | Kawaguchi et al. |
| 4,340,479 A | 7/1982 | Pall |
| 4,353,802 A | 10/1982 | Hara et al. |
| 4,354,443 A | 10/1982 | Abrahamson |
| 4,384,474 A | 5/1983 | Kowalski |
| 4,385,150 A | 5/1983 | Miyake et al. |
| 4,388,189 A | 6/1983 | Kawaguchi et al. |
| 4,407,975 A | 10/1983 | Yamaguchi |
| 4,431,545 A | 2/1984 | Pall et al. |
| 4,439,217 A | 3/1984 | Yamabe et al. |
| 4,451,369 A | 5/1984 | Sekino et al. |
| 4,511,471 A | 4/1985 | Müller |
| 4,519,909 A | 5/1985 | Castro |
| 4,540,490 A | 9/1985 | Shibata et al. |
| 4,547,289 A | 10/1985 | Okano et al. |

(Continued)

FOREIGN PATENT DOCUMENTS

| | | |
|---|---|---|
| CA | 897069 A | 4/1972 |
| CA | 2207893 A1 | 12/1997 |

(Continued)

OTHER PUBLICATIONS

English Language Machine Translation JP 06-027215 B.*
English Language Machine Translation JP 2004-230280 A.*
International Search Report dated Sep. 30, 2005 for Application No. PCT/AU2005/000975.
International Preliminary Report on Patentability dated Jun. 30, 2006 for Application No. PCT/AU2005/000975.
Extended European Search Report dated Mar. 3, 2009 for European Patent Application No. 0575700.
Almulla et al., Desalination, 153 (2002), pp. 237-243.
Anonymous, "*Nonwoven Constructions of Dyneon™ THV and Dyneon™ The Fluorothermoplastics*", Research Disclosure Journal, Apr. 1999, RD 420013, 2 pages.

(Continued)

*Primary Examiner* — Michael Pepitone

(57) ABSTRACT

A method of coating a polymer comprising the step of treating the polymer with an activating agent to produce a reactive polymer, for example treating a polymer bearing at least one X (halogen) group and at least one H with base to eliminate HX. The reactive polymer is then reacted with a reactive coating, for example PVP, preferably in the presence of an initiator like persulfate anions, to produce a coated polymer, which may be hydrophilic in nature.

19 Claims, No Drawings

(56) References Cited

U.S. PATENT DOCUMENTS

| | | |
|---|---|---|
| 4,559,139 A | 12/1985 | Uemura et al. |
| 4,609,465 A | 9/1986 | Miller |
| 4,614,109 A | 9/1986 | Hofmann |
| 4,618,533 A | 10/1986 | Steuck |
| 4,623,670 A | 11/1986 | Mutoh et al. |
| 4,623,690 A | 11/1986 | Patzschke et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,670,145 A | 6/1987 | Edwards |
| 4,673,507 A | 6/1987 | Brown |
| 4,687,561 A | 8/1987 | Kunz |
| 4,688,511 A | 8/1987 | Gerlach et al. |
| 4,695,592 A | 9/1987 | Itoh et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,735,261 A | 4/1988 | Huebner |
| 4,737,425 A | 4/1988 | Lin et al. |
| 4,744,240 A | 5/1988 | Reichelt |
| 4,756,875 A | 7/1988 | Tajima et al. |
| 4,758,251 A | 7/1988 | Swedo et al. |
| 4,763,612 A | 8/1988 | Iwanami |
| 4,767,539 A | 8/1988 | Ford |
| 4,775,471 A | 10/1988 | Nagai et al. |
| 4,779,448 A | 10/1988 | Gogins |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,812,269 A | 3/1989 | Harttig et al. |
| 4,816,160 A | 3/1989 | Ford et al. |
| 4,840,227 A | 6/1989 | Schmidt |
| 4,846,970 A | 7/1989 | Bertelsen et al. |
| 4,849,106 A | 7/1989 | Mir |
| 4,855,163 A | 8/1989 | Joffee et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,886,668 A | 12/1989 | Haslam et al. |
| 4,888,115 A | 12/1989 | Marinaccio et al. |
| 4,892,739 A | 1/1990 | Shah et al. |
| 4,904,426 A | 2/1990 | Lundgard et al. |
| 4,909,943 A | 3/1990 | Fibiger et al. |
| 4,921,610 A | 5/1990 | Ford et al. |
| 4,931,186 A | 6/1990 | Ford et al. |
| 4,935,143 A | 6/1990 | Kopp et al. |
| 4,963,304 A | 10/1990 | Im et al. |
| 4,968,733 A | 11/1990 | Muller et al. |
| 4,999,038 A | 3/1991 | Lundberg |
| 5,005,430 A | 4/1991 | Kibler et al. |
| 5,015,275 A | 5/1991 | Beck et al. |
| 5,017,292 A | 5/1991 | DiLeo et al. |
| 5,019,260 A | 5/1991 | Gsell et al. |
| 5,024,762 A | 6/1991 | Ford et al. |
| 5,032,282 A | 7/1991 | Linder et al. |
| 5,043,113 A | 8/1991 | Kafchinski et al. |
| 5,049,275 A | 9/1991 | Gillberg-LaForce et al. |
| 5,066,375 A | 11/1991 | Parsi et al. |
| 5,066,401 A | 11/1991 | Müller et al. |
| 5,066,402 A | 11/1991 | Anselme et al. |
| 5,069,065 A | 12/1991 | Sprunt et al. |
| 5,075,065 A | 12/1991 | Effenberger et al. |
| 5,076,925 A | 12/1991 | Roesink et al. |
| 5,079,272 A | 1/1992 | Allegrezza et al. |
| 5,094,750 A | 3/1992 | Kopp et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,137,633 A | 8/1992 | Wang |
| 5,138,870 A | 8/1992 | Lyssy |
| 5,147,553 A | 9/1992 | Waite |
| 5,151,189 A | 9/1992 | Hu et al. |
| 5,151,191 A | 9/1992 | Sunaoka et al. |
| 5,151,193 A | 9/1992 | Grobe et al. |
| 5,158,721 A | 10/1992 | Allegrezza, Jr. et al. |
| 5,182,019 A | 1/1993 | Cote et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,275,766 A | 1/1994 | Gadkaree et al. |
| 5,277,812 A | 1/1994 | Hu et al. |
| 5,282,971 A | 2/1994 | Degen et al. |
| 5,286,324 A | 2/1994 | Kawai et al. |
| 5,288,324 A | 2/1994 | Shaneyfelt |
| 5,297,420 A | 3/1994 | Gilliland et al. |
| 5,320,760 A | 6/1994 | Freund et al. |
| 5,353,630 A | 10/1994 | Soda et al. |
| 5,354,587 A | 10/1994 | Abayasekara |
| 5,361,625 A | 11/1994 | Ylvisaker |
| 5,364,527 A | 11/1994 | Zimmermann et al. |
| 5,376,274 A | 12/1994 | Muller et al. |
| 5,389,260 A | 2/1995 | Hemp et al. |
| 5,396,019 A | 3/1995 | Sartori et al. |
| 5,401,401 A | 3/1995 | Hickok et al. |
| 5,403,479 A | 4/1995 | Smith et al. |
| 5,403,483 A | 4/1995 | Hayashida et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,451,317 A | 9/1995 | Ishida et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,491,023 A | 2/1996 | Tsai et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,543,465 A | 8/1996 | Bell et al. |
| 5,547,575 A | 8/1996 | Demmer et al. |
| 5,554,283 A | 9/1996 | Brinda et al. |
| 5,607,593 A | 3/1997 | Cote et al. |
| 5,629,084 A * | 5/1997 | Moya .................. 428/315.7 |
| 5,639,373 A | 6/1997 | Mahendran et al. |
| 5,643,455 A | 7/1997 | Kopp et al. |
| 5,647,988 A | 7/1997 | Kawanishi et al. |
| 5,725,769 A | 3/1998 | Miller et al. |
| 5,747,605 A | 5/1998 | Breant et al. |
| D396,046 S | 7/1998 | Scheel et al. |
| D396,477 S | 7/1998 | Sadr |
| 5,783,083 A | 7/1998 | Henshaw et al. |
| D396,726 S | 8/1998 | Sadr et al. |
| D400,890 S | 11/1998 | Gambardella |
| 5,871,823 A | 2/1999 | Anders et al. ............ 427/512 |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,958,243 A | 9/1999 | Lawrence et al. |
| 5,981,614 A | 11/1999 | Adiletta |

| | | |
|---|---|---|
| 5,988,400 A | 11/1999 | Karachevtcev et al. |
| 6,024,872 A | 2/2000 | Mahendran et al. |
| 6,039,872 A | 3/2000 | Wu et al. |
| 6,042,677 A | 3/2000 | Mahendran et al. |
| 6,045,698 A | 4/2000 | Côté et al. |
| 6,045,899 A | 4/2000 | Wang et al. |
| 6,048,454 A | 4/2000 | Jenkins |
| 6,056,903 A | 5/2000 | Greenwood et al. |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,794 A | 9/2000 | Kumara et al. |
| 6,146,747 A | 11/2000 | Wang et al. |
| 6,156,200 A | 12/2000 | Zha et al. |
| 6,159,369 A | 12/2000 | Strohm et al. |
| 6,159,373 A | 12/2000 | Beck et al. |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,294,039 B1 | 9/2001 | Mahendran et al. |
| 6,299,773 B1 | 10/2001 | Takamura et al. |
| 6,315,895 B1 | 11/2001 | Summerton et al. |
| 6,322,703 B1 | 11/2001 | Taniguchi et al. |
| 6,325,928 B1 | 12/2001 | Pedersen et al. |
| 6,337,018 B1 | 1/2002 | Mickols |
| RE37,549 E | 2/2002 | Mahendran et al. |
| 6,354,444 B1 | 3/2002 | Mahendran |
| 6,375,848 B1 | 4/2002 | Cote et al. |
| 6,423,784 B1 | 7/2002 | Hamrock et al. |
| 6,440,303 B2 | 8/2002 | Spriegel |
| D462,699 S | 9/2002 | Johnson et al. |
| 6,448,062 B1 | 9/2002 | Huth et al. |
| 6,465,748 B2 | 10/2002 | Yamanashi et al. |
| 6,491,165 B2 | 12/2002 | Kuske |
| 6,495,041 B2 | 12/2002 | Taniguchi et al. |
| 6,524,481 B2 | 2/2003 | Zha et al. |
| 6,550,747 B2 | 4/2003 | Rabie et al. |
| 6,555,005 B1 | 4/2003 | Zha et al. |
| 6,565,748 B1 | 5/2003 | Wang et al. |
| 6,582,603 B1 | 6/2003 | Suzuki et al. |
| 6,595,167 B2 | 7/2003 | Kaesgen |
| 6,596,167 B2 | 7/2003 | Ji et al. |
| D478,913 S | 8/2003 | Johnson et al. |
| 6,602,391 B2 | 8/2003 | Serikov |
| 6,620,319 B2 | 9/2003 | Behmann et al. |
| 6,635,104 B2 | 10/2003 | Komkova et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,699,611 B2 | 3/2004 | Kim et al. |
| 6,705,465 B2 | 3/2004 | Ling et al. |
| 6,721,529 B2 | 4/2004 | Chen et al. |
| 6,723,246 B2 | 4/2004 | Krulik |
| 6,723,758 B2 | 4/2004 | Stone et al. |
| 6,727,305 B1 | 4/2004 | Pavez Aranguiz |
| 6,761,013 B2 | 7/2004 | Tippey |
| 6,770,202 B1 | 8/2004 | Kidd et al. |
| 6,783,008 B2 | 8/2004 | Zha et al. |
| 6,790,912 B2 | 9/2004 | Blong |
| 6,793,820 B1 | 9/2004 | McCray et al. |
| 6,811,696 B2 | 11/2004 | Wang et al. |
| 6,821,420 B2 | 11/2004 | Zha et al. |
| 6,830,782 B2 * | 12/2004 | Kanazawa ............... 427/458 |
| 6,851,259 B2 | 2/2005 | Simburger et al. |
| 6,861,466 B2 | 3/2005 | Dadalas et al. |
| 6,872,305 B2 | 3/2005 | Johnson et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,965,033 B2 | 11/2005 | Jiang et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,000,764 B2 | 2/2006 | Otsubo |
| 7,041,728 B2 | 5/2006 | Zipplies et al. |
| 7,067,058 B2 | 6/2006 | Yeh et al. |
| 7,070,909 B2 | 7/2006 | Japp et al. |
| 7,128,768 B2 | 10/2006 | Liu et al. |
| 7,226,541 B2 | 6/2007 | Muller et al. |
| 7,229,712 B2 | 6/2007 | Eshraghi et al. |
| 7,247,238 B2 | 7/2007 | Mullette et al. |
| 7,300,022 B2 | 11/2007 | Muller |
| 7,390,418 B2 | 6/2008 | Martin et al. |
| 7,395,646 B2 | 7/2008 | Salman |
| 7,404,896 B2 | 7/2008 | Muller |
| 7,449,112 B2 | 11/2008 | Lee et al. |
| 7,459,085 B2 | 12/2008 | Koguma et al. |
| 7,537,718 B2 | 5/2009 | Mezhirov et al. |
| 7,632,439 B2 | 12/2009 | Mullette et al. |
| 7,648,034 B2 | 1/2010 | Charkoudian et al. |
| 7,662,212 B2 | 2/2010 | Mullette et al. |
| 7,819,956 B2 | 10/2010 | Muller |
| 7,867,417 B2 | 1/2011 | Mullette |
| 2002/0104439 A1 | 8/2002 | Komkova et al. |
| 2002/0148767 A1 | 10/2002 | Johnson et al. |
| 2003/0065302 A1 | 4/2003 | Kuroda |
| 2003/0073970 A1 | 4/2003 | Suga |
| 2003/0178365 A1 | 9/2003 | Zha et al. |
| 2003/0226797 A1 | 12/2003 | Phelps |
| 2004/0084369 A1 | 5/2004 | Zha et al. |
| 2004/0085300 A1 | 5/2004 | Matusis |
| 2004/0092901 A1 | 5/2004 | Reece et al. |
| 2004/0145076 A1 | 7/2004 | Zha et al. |
| 2004/0167490 A1 | 8/2004 | Nelson et al. |
| 2004/0167493 A1 | 8/2004 | Jarpenberg |
| 2004/0168947 A1 | 9/2004 | McDonald |
| 2004/0172002 A1 | 9/2004 | Nelson |
| 2004/0176735 A1 | 9/2004 | Snell |
| 2004/0195172 A1 | 10/2004 | Yeh et al. |
| 2004/0217053 A1 | 11/2004 | Zha et al. |
| 2005/0015052 A1 | 1/2005 | Klippen |
| 2005/0029185 A1 | 2/2005 | Muller |
| 2005/0032982 A1 | 2/2005 | Muller |
| 2005/0035065 A1 | 2/2005 | Martin |
| 2005/0098494 A1 * | 5/2005 | Mullette et al. .......... 210/500.27 |
| 2005/0218069 A1 | 10/2005 | Lee et al. |
| 2006/0157404 A1 * | 7/2006 | Mullette et al. .......... 210/500.21 |
| 2006/0178480 A1 * | 8/2006 | Tada et al. ....................... 525/199 |
| 2006/0228483 A1 | 10/2006 | Abidine |
| 2006/0237038 A1 | 10/2006 | Jetten et al. |
| 2007/0007197 A1 | 1/2007 | Mahendran et al. |
| 2007/0107884 A1 | 5/2007 | Sirkar et al. |
| 2008/0203018 A1 | 8/2008 | Muller et al. |
| 2008/0214687 A1 | 9/2008 | Muller et al. |
| 2010/0000942 A1 | 1/2010 | Muller et al. |
| 2010/0119815 A1 | 5/2010 | Kim |
| 2010/0213117 A1 | 8/2010 | Mullette et al. |
| 2011/0147308 A1 | 6/2011 | Johnston-Hall et al. |

FOREIGN PATENT DOCUMENTS

| | | |
|---|---|---|
| CA | 2428457 A1 | 5/2002 |
| CA | 2440961 A1 | 9/2002 |
| CN | 1159770 A | 9/1997 |
| CN | 1552507 | 12/2004 |
| DE | 3904544 A1 | 8/1990 |
| DE | 4007383 A | 9/1991 |
| DE | 4117281 A1 | 1/1992 |
| DE | 4113420 A1 | 10/1992 |
| DE | 4117422 C1 | 11/1992 |
| DE | 19503060 | 8/1996 |
| DE | 29906389 | 6/1999 |
| EP | 012557 B1 | 2/1983 |
| EP | 050447 B1 | 10/1985 |
| EP | 229019 B1 | 7/1987 |
| EP | 250337 A1 | 12/1987 |

| | | | | | | |
|---|---|---|---|---|---|---|
| EP | 261734 A1 | 3/1988 | | JP | 06-343837 | 12/1994 |
| EP | 0341151 A2 | 11/1989 | | JP | 07-000770 | 1/1995 |
| EP | 407900 A2 | 1/1991 | | JP | 07-024272 | 1/1995 |
| EP | 419396 A1 | 3/1991 | | JP | 07003043 A | 1/1995 |
| EP | 463627 A2 | 1/1992 | | JP | 07-155758 | 6/1995 |
| EP | 492942 A2 | 7/1992 | | JP | 07155570 A | 6/1995 |
| EP | 509663 B2 | 10/1992 | | JP | 07-185268 | 7/1995 |
| EP | 550798 A1 | 7/1993 | | JP | 07-185271 | 7/1995 |
| EP | 395133 B1 | 2/1995 | | JP | 07-275665 | 10/1995 |
| EP | 492446 B1 | 11/1995 | | JP | 08-010585 | 1/1996 |
| EP | 430082 B1 | 6/1996 | | JP | 08052331 A | 2/1996 |
| EP | 581168 | 10/1996 | | JP | 09-141063 | 6/1997 |
| EP | 763758 A1 | 3/1997 | | JP | 09-220569 | 8/1997 |
| EP | 0772488 A1 | 5/1997 | | JP | 09-324067 | 12/1997 |
| EP | 911073 A1 | 4/1999 | | JP | 09-512857 | 12/1997 |
| EP | 920904 A2 | 6/1999 | | JP | 09512857 | 12/1997 |
| EP | 1034835 A1 | 9/2000 | | JP | 10-060142 A | 3/1998 |
| EP | 1052012 A1 | 11/2000 | | JP | 10-156149 | 6/1998 |
| EP | 1236503 B1 | 8/2004 | | JP | 11-165200 | 6/1999 |
| FR | 2620712 | 3/1989 | | JP | 11152366 A | 6/1999 |
| FR | 2674448 | 10/1992 | | JP | 11302438 | 11/1999 |
| FR | 2850297 A1 | 7/2004 | | JP | 11302438 A * | 11/1999 |
| GB | 702911 | 1/1954 | | JP | 2000-342932 | 12/2002 |
| GB | 2253572 A | 9/1992 | | JP | 2004230280 | 8/2004 |
| GB | 2390042 | 12/2003 | | JP | 2004230280 A * | 8/2004 |
| JP | 53-028083 | 3/1978 | | JP | 2004523338 T | 8/2004 |
| JP | 53-28083 | 3/1978 | | JP | 2005-514517 T | 5/2005 |
| JP | 55-129155 | 6/1980 | | JP | 2005154551 | 6/2005 |
| JP | 58-088007 | 5/1983 | | JP | 2005-528213 A | 9/2005 |
| JP | 60260628 | 12/1985 | | JP | 2005-537120 T | 12/2005 |
| JP | 60260628 A * | 12/1985 | | JP | 2006517469 T | 7/2006 |
| JP | 61-097006 | 5/1986 | | KR | 2002031017 | 7/2002 |
| JP | 61-107905 | 5/1986 | | KR | 2002061017 | 7/2002 |
| JP | 61-192309 | 8/1986 | | WO | WO 88-06200 | 8/1988 |
| JP | 61-257203 | 11/1986 | | WO | WO 90-00434 | 1/1990 |
| JP | 61-263605 | 11/1986 | | WO | 9117204 | 11/1991 |
| JP | 62-004408 | 1/1987 | | WO | WO 93-02779 | 2/1993 |
| JP | 62068828 | 3/1987 | | WO | WO 93-15827 | 8/1993 |
| JP | 62068828 A * | 3/1987 | | WO | WO 95-34424 | 12/1995 |
| JP | 62-114609 | 5/1987 | | WO | 9603202 A1 | 2/1996 |
| JP | 62-140607 | 6/1987 | | WO | WO 96-07470 A1 | 3/1996 |
| JP | 62-179540 | 8/1987 | | WO | 9614913 A1 | 5/1996 |
| JP | 62-250908 | 10/1987 | | WO | WO 96-41676 | 12/1996 |
| JP | 63-097634 | 4/1988 | | WO | WO 98-22204 | 5/1998 |
| JP | S63-38884 | 10/1988 | | WO | WO 98-25694 | 6/1998 |
| JP | 1075542 | 3/1989 | | WO | WO 98-28066 | 7/1998 |
| JP | 01075542 A * | 3/1989 | | WO | WO 99-01207 | 1/1999 |
| JP | 01-307409 | 12/1989 | | WO | WO 0043115 A1 | 7/2000 |
| JP | 2009498 A | 1/1990 | | WO | WO 0238256 A1 | 5/2002 |
| JP | 02-031200 | 2/1990 | | WO | 02087734 | 11/2002 |
| JP | 02-086822 A | 3/1990 | | WO | WO03/068374 * | 8/2003 |
| JP | 02-144132 | 6/1990 | | WO | WO 03080228 | 10/2003 |
| JP | 02-164423 | 6/1990 | | WO | 03095078 | 11/2003 |
| JP | 02-284035 | 11/1990 | | WO | WO 2004078327 A | 9/2004 |
| JP | 02302449 A | 12/1990 | | WO | WO 2004094049 A | 11/2004 |
| JP | 03-018373 | 1/1991 | | WO | 2005005028 | 1/2005 |
| JP | 03-110445 | 5/1991 | | WO | WO 2005002712 A | 1/2005 |
| JP | 03-137927 A | 6/1991 | | WO | WO 2005030916 A3 | 4/2005 |
| JP | 03186325 A | 8/1991 | | WO | 2006002479 | 1/2006 |
| JP | 04022428 A | 1/1992 | | WO | 2006058384 A1 | 6/2006 |
| JP | 04-187224 | 7/1992 | | WO | 2006058394 | 8/2006 |
| JP | 04-250898 | 9/1992 | | WO | 2007006104 A1 | 1/2007 |
| JP | 04-265128 | 9/1992 | | WO | 2007035987 A1 | 4/2007 |
| JP | 04293528 A | 10/1992 | | | | |
| JP | 04300636 A | 10/1992 | | | | |
| JP | 04-310223 | 11/1992 | | | | |
| JP | 05-023557 | 2/1993 | | | | |
| JP | 05-096136 | 4/1993 | | | | |
| JP | 05-96140 | 4/1993 | | | | |
| JP | 05-131124 | 5/1993 | | | | |
| JP | 05115760 A | 5/1993 | | | | |
| JP | 05-157654 | 6/1993 | | | | |
| JP | 05-285348 | 11/1993 | | | | |
| JP | 06-071120 | 3/1994 | | | | |
| JP | 06-087935 A | 3/1994 | | | | |
| JP | 06-114240 | 4/1994 | | | | |
| JP | 06027215 B * | 4/1994 | | | | |
| JP | 06-218237 | 8/1994 | | | | |
| JP | 06-285496 | 10/1994 | | | | |

OTHER PUBLICATIONS

Hall, R. (1982) Peroxides and Peroxy Compounds, Inorganic, in Kirk-Othmer Encyclopedia of Chemical Technology, vol. 17, 3$^{rd}$ edition, John Wiley & Sons, p. 14-16.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Kolthoff, I.M., et al., "The Chemistry of Persulfate—The Kinetics and Mechanism of the Decomposition of the Persulfate Ion in Aqueous Medium", Journal of the American Chemical Society, Jul. 1951, vol. 73, pp. 3055-3059.

Lloyd, D.R. et al. "Microporous Membrane Formation via Thermally Induced Phase Separation/Solid-Liquid Phase Separation" *Journal of Membrane Science* (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Ramaswammy S. et al. "Fabrication of Ply (ECTFE) Membranes via thermally induced phase Separation", *Journal of Membrane Science*, (Dec. 1, 2002), pp. 175-180, vol. 210 No. I, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

White et al.,*The Chemical Engineering Journal*, 52 (1993), pp. 73-77.

Zenon, "Proposal for ZeeWeed® Membrane Filtration Equipment System for the City of Westminster, Colorado, Proposal No. 479-99," Mar. 2000, entire publication.

Dupont Oxone Monopersulfate Compound, product literature (2008) pp. 1-3. http://ww2.dupont.com/Oxone/en_US/assets/downloads/K20101%20Oxone%20General%20Info.pdf.

International Search Report dated Sep. 13, 2005 for PCT Application No. PCT/AU2005/000961.

International Search Report dated Aug. 16, 2006 for Application No. PCT/AU2006/000997.

International Preliminary Report on Patentability dated Jun. 8, 2007 for Application No. PCT/AU2006/000997.

Supplementary EP Search Report dated Jun. 25, 2007 for European Application No. EP 05 75 6970.

International Preliminary Report on Patentability dated Jul. 12, 2006 for Application No. PCT/AU2006/000864.

International Preliminary Report on Patentability dated Feb. 10, 2006 for Application No. PCT/AU2005/001820.

Australian First Examiner's Report dated Nov. 10, 2009 for Application No. 2005259840.

Canadian Office Action dated Feb. 28, 2012 for Application No. 2,530,805.

Canadian Office Action dated Jun. 19, 2012 for Application No. 2,571,502.

Chinese Office Action dated Mar. 6, 2012 for counterpart Chinese Application 200480019288.1 (with translation).

Japanese Office Action dated Sep. 13, 2011 for Application No. 2007-518412 (with translation).

Notification of Transmittal of the International Search Report and the Written Opinion dated Jan. 17, 2012 for International Application No. PCT/US2011/052110.

PCT International Search Report Aug. 21, 2007 for corresponding Application No. PCT/AU2007/000979.

PCT International Search Report on Patentability dated Jan. 14, 2009 for corresponding Application No. PCT/AU2007/000979.

PCT International Search Report mailed Feb. 29, 2011 corresponding to PCT International Application No. PCT/US10/61245 filed Dec. 20, 2010 (11 pages).

Zeman et al., "Microfiltration and Ultrafiltration Principles and Practice," (1996) ISBN 0-8247-9735-3, pp. 144-145 and 167.

Bao, Zhu, Chen, Xu and Xu, Progresses of Hydrophilic Modification and Functionalization of Poly(vinylidene fluoride) Porous Membranes, Journal of Functional Polymers, vol. 16, No. 2, pp. 269-270, Jun. 2003, Institute of Polymer Science, Zhejiang University.

Chinese Office Action dated Dec. 24, 2010 for counterpart Chinese Application 200480019288.1.

Chinese Office Action dated Oct. 30, 2009 for counterpart Chinese Application 200480019288.1.

English Translation of Office Action for Japanese Application No. 2006-517906.

European Search Report for European Application No. 0229019 A3, dated Nov. 11, 1988.

International Preliminary Report on Patentability dated Oct. 31, 2006 for Application No. PCT/AU2005/001820.

International Preliminary Report on Patentability dated Sep. 28, 2007 for Application No. PCT/AU2006/000864.

International Search Report dated Jul. 12, 2006 for Application No. PCT/AU2006/000864.

International Search Report dated Sep. 17, 2004 for PCT/AU2004/000922.

Written Opinion of the International Searching Authority dated Feb. 7, 2006 for Application No. PCT/AU2005/001820.

Written Opinion of the International Searching Authority dated Jul. 7, 2006 for Application No. PCT/AU2006/000864.

European Examination Report for Application No. 04737543.1 dated Nov. 9, 2010.

Australian Examiner's Report dated Feb. 18, 2011 for Application No. 2006261581.

Canadian Office Action dated Mar. 10, 2011 for Application No. 2,530,805.

European Examination Report for Application No. 04737543.1, dated Nov. 9, 2010.

Japanese Office Action dated Mar. 8, 2011 for Application No. 2008-517272.

Japanese Office Action dated Nov. 24, 2010 for Application No. 2008-520681.

New Zealand Examination Report dated Feb. 23, 2011 for Application No. 563980.

New Zealand Examination Report dated Oct. 16, 2009 from Application No. 563980.

Written Opinion of the International Searching Authority dated Aug. 16, 2006 for Application No. PCT/AU2006/000997.

Bhardwaj et al., Polysulfone Hollow Fibre Gas Separation Membranes filled with submicron particles; Annals of the New York Academy of Sciences; Mar. 2003, vol. 984, Advanced Membrane Technology, pp. 318-328.

Wharry, Jr., "Fluropolymer Heat Exchangers," Metal Finishing vol. 99, Supplement 1, Jan. 2001, pp. 760-777.

Zaheed et al., "Review of polymer compact heat exchangers, with special emphasis on a polymer film unit," Journal of Applied Thermal Engineering, 2004, vol. 24, pp. 2323-2358.

Ebewele et al.,"Polymer Science and Technology," p. 445.

Houghman et al, "Fluoropolymers: Synthesis," p. 92.

Smolders et al., "Liquid-liquid phase separation in concentrated solutions of non-crystallizable polymers by spinodal decomposition," Kolloid-Z. u. Polymere, 243, 14-20 (1971).

Supplementary EP Search Report dated Apr. 15, 2010 for European Application No. EP 06 74 1265.

Supplementary EP Search Report dated Nov. 25, 2009 for European Application No. EP 06 76 0859.

Chinese Office Action dated Apr. 21, 2010 for Chinese Application No. 200680022006.2.

\* cited by examiner

HYDROPHILIC MEMBRANES

TECHNICAL FIELD

The invention relates to polymeric membranes having a hydrophilic layer grafted to the surface thereof and to methods for the preparation of such membranes. The invention particularly relates to the field of ultrafiltration and microfiltration.

BACKGROUND ART

The following discussion is not to be construed as an admission with regard to the state of the common general knowledge.

Synthetic polymeric membranes are well known in the field of ultrafiltration and microfiltration for a variety of applications including desalination, gas separation, filtration and dialysis. The properties of the membranes vary depending on the morphology of the membrane i.e. properties such as symmetry, pore shape, pore size and the chemical nature of the polymeric material used to form the membrane.

Different membranes can be used for specific separation processes, including microfiltration, ultrafiltration and reverse osmosis. Microfiltration and ultrafiltration are pressure driven processes and are distinguished by the size of the particle or molecule that the membrane is capable of retaining or passing. Microfiltration can remove very fine colloidal particles in the micrometer and submicrometer range. As a general rule, microfiltration can filter particles down to 0.05 μm, whereas ultrafiltration can retain particles as small as 0.01 μm and smaller. Reverse Osmosis operates on an even smaller scale.

Microporous phase inversion membranes are particularly well suited to the application of removal of viruses and bacteria.

A large surface area is needed when a large filtrate flow is required. A commonly used technique to minimize the size of the apparatus used is to form a membrane in the shape of a hollow porous fibre. A large number of these hollow fibres (up to several thousand) are bundled together and housed in modules. The fibres act in parallel to filter a solution for purification, generally water, which flows in contact with the outer surface of all the fibres in the module. By applying pressure, the water is forced into the central channel, or lumen, of each of the fibres while the microcontaminants remain trapped outside the fibres. The filtered water collects inside the fibres and is drawn off through the ends.

The fibre module configuration is a highly desirable one as it enables the modules to achieve a very high surface area per unit volume.

In addition to the arrangement of fibres in a module, it is also necessary for the polymeric fibres themselves to possess the appropriate microstructure to allow microfiltration to occur.

Desirably, the microstructure of ultrafiltration and microfiltration membranes is asymmetric, that is, the pore size gradient across the membrane is not homogeneous, but rather varies in relation to the cross-sectional distance within the membrane. Hollow fibre membranes are preferably asymmetric membranes possessing tightly bunched small pores on one or both outer surfaces and larger more open pores towards the inside edge of the membrane wall.

This microstructure has been found to be advantageous as it provides a good balance between mechanical strength and filtration efficiency.

As well as the microstructure, the chemical properties of the membrane are also important. The hydrophilic or hydrophobic nature of a membrane is one such important property.

Hydrophobic surfaces are defined as "water hating" and hydrophilic surfaces as "water loving". Many of the polymers used to cast porous membranes are hydrophobic polymers. Water can be forced through a hydrophobic membrane by use of sufficient pressure, but the pressure needed is very high (150-300 psi), and a membrane may be damaged at such pressures and generally does not become wetted evenly.

Hydrophobic microporous membranes are typically characterised by their excellent chemical resistance, biocompatibility, low swelling and good separation performance. Thus, when used in water filtration applications, hydrophobic membranes need to be hydrophilised or "wet out" to allow water permeation.

It is also important that membranes have a high resistance to aggressive chemical species typically found in water requiring filtration, in particular, to oxidising agents and conditions of high pH (i.e. caustic solutions). In particular with water filtration membranes, chlorine resistance is highly desirable. Chlorine is used to kill bacteria and is invariably present in town water supplies. Even at low concentrations, a high throughput of chlorinated water can expose membranes to large amounts of chlorine over the working life of a membrane can lead to yellowing or brittleness which are signs of degradation of the membrane.

Currently, poly(tetrafluoroethylene) (PTFE), polyethylene (PE), polypropylene (PP) and poly(vinylidene fluoride) (PVDF) are the most popular and available hydrophobic membrane materials. However, the search for membrane materials which will provide better chemical stability and performance while retaining the desired physical properties required to allow the membranes to be formed and worked in an appropriate manner has suggested that halogentated polymers may be suitable. In particular, Halar ultrafiltration (UF) membranes have been found to be superior in nearly every way to any unsupported hollow-fibre UF membrane on the market.

Microporous synthetic membranes are particularly suitable for use in hollow fibres and are produced by phase inversion. In this process, at least one polymer is dissolved in an appropriate solvent and a suitable viscosity of the solution is achieved. The polymer solution can be cast as a film or hollow fibre, and then immersed in precipitation bath such as water. This causes separation of the homogeneous polymer solution into a solid polymer and liquid solvent phase. The precipitated polymer forms a porous structure containing a network of uniform pores. Production parameters that affect the membrane structure and properties include the polymer concentration, the precipitation media and temperature and the amount of solvent and non-solvent in the polymer solution. These factors can be varied to produce microporous membranes with a large range of pore sizes (from less than 0.1 to 20 μm), and possess a variety of chemical, thermal and mechanical properties.

Hollow fibre ultrafiltration and microfiltration membranes are generally produced by either diffusion induced phase separation (the DIPS process) or by thermally induced phase separation (the TIPS process).

The TIPS process is described in more detail in PCT AU94/00198 (WO 94/17204) AU 653528, the contents of which are incorporated herein by reference.

The quickest procedure for forming a microporous system is thermal precipitation of a two component mixture, in which the solution is formed by dissolving a thermoplastic polymer in a solvent which will dissolve the polymer at an elevated temperature but will not do so at lower temperatures. Such a solvent is often called a latent solvent for the polymer. The solution is cooled and, at a specific temperature which depends upon the rate of cooling, phase separation occurs and the polymer rich phase separates from the solvent.

The term "solvent" as used herein will be understood by those in the art to encompass: single component mixtures and multiple component mixtures. Multiple component mixtures may include, in addition to solvent components, one or more non-solvents.

In the present case the inventors have sought to find a way to modify polymers and polymeric membranes made from halogenated polymers to enhance the range of applications in which they may be used, while at the same time, retaining the good intrinsic resistance of the material to chemical, physical and mechanical degradation. One such polymer is halar.

Halar, or poly (ethylene chlorotrifluoroethylene), is a 1:1 alternating copolymer of ethylene and chlorotrifluoroethylene with the following structure:

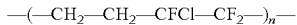

Halar and related membranes have extremely good chemical resistance to species such as chlorine, peroxide and ozone, and are stable over a wide range of pHs (0-14)

Processes used to produce flat sheet Halar membranes are disclosed for example in U.S. Pat. No. 4,702,836. The properties of Halar make it highly desirable in the field of ultrafiltration and microfiltration. In particular, Halar has extremely good properties in relation to its resistance both to chlorine and to caustic solutions, but also to ozone and other strong oxidising agents.

Halar membranes also have good mechanical and structural properties. Halar produces membranes of near-perfect sub-structure, with little or no defects or macrovoids. Good permeabilities, in the range of 300-1000 lmh/bar can be achieved. Halar membranes, particularly hollow fibre membranes, have a good break extension, of greater than 100%, a break force in excess of 2N and exhibit high flexibility with little or no brittleness.

As a result of this good integrity, Halar membranes have been able to achieve log virus retentions (LRV) of $\geq 4$, ie better than 1 in 10,000 viral particles removed.

However, Halar and related membranes are not without some drawbacks. They have a tendency to exhibit reasonable performance initially, but after a relatively short time in use, can suffer from irreversible fouling, pore-compaction or both.

In the present case the inventors have sought to find a way to modify polymers and polymeric membranes made from halogenated polymer such as Halar to enhance the range of applications in which they may be used, while at the same time, retaining the good intrinsic resistance of the material to chemical, physical and mechanical degradation. The most desirable modification is to render the material hydrophilic.

Hydrophilisation of membranes with agents such as PVP has been attempted previously. U.S. Pat. Nos. 5,376,274 and 5,629,084 both disclose coating a polysulfone membrane with a PVP/initiator (persulfate) solution and then heating the soaked membrane to crosslink the PVP. This was successful in converting the hydrophobic membrane into a hydrophilic one to improve the wettability of the membrane for filtering aqueous solutions. However, the treatment is of a very short term nature and only a minor increase in the time to irreversible fouling is realised.

Halar, because of its very inertness, is not readily amendable to functionalisation or chemical modification, and for this reason, has not been used as widely as some other membrane forming polymers which are less resistant to environmental degradation. Attempts to hydrophilise Halar in the past have proved difficult for this very reason.

One approach to hydrophilising halar membranes carried out by the present applicant has been to remove HCl from the polymer by exposure to aqueous solutions of alkali earth hydroxides or alkoxides, such as caustic soda or sodium methoxide to produce an activated form of halar possessing double bonds at the surface of the polymer. The activated halar is then treated with an oxidising agent, such Fenton's reagent, which acts as a source of hydroxyl radicals. The hydroxyl radicals react with the double bonds to produce a hydroxylated form of halar which is more hydrophilic than unmodified halar. This is disclosed in AU 2004903680, the contents of which is incorporated by reference in its entirety in the present application. This hydroxylated form of halar is also more amenable to reaction with other chemical species. However, alternative approaches for the long term hydrophilisation of hydrophobic membranes are still desirable.

It is an object of the present invention to overcome or ameliorate at least one of the disadvantages of the prior art, or to provide a useful alternative, particularly in terms of methods of production.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

DESCRIPTION OF THE INVENTION

According to a first aspect, the invention provides a method of coating a polymer comprising the step of treating said polymer with an activating agent to produce a reactive polymer, and reacting said reactive polymer with a reactive coating to produce a coated polymer.

Preferably, the polymer bears at least one X group, where X is F or Cl, and at least one H.

The polymer which bears at least one X group may be a wholly or partially halogenated homopolymer, copolymer or terpolymer, one or more wholly or partially halogenated homopolymers, copolymers or terpolymers, or a blend of one or more wholly or partially halogenated homopolymers, copolymers or terpolymers with any miscible non-halogenated polymer, polymer blend or polymer mixture.

Preferably, the polymer has at least one X (halogen) bonded to a carbon in a position a to a hydrogen, that is, it is preferred if the X and the H are on adjacent carbon atoms.

Specific examples of halogenated polymers suitable for use in the present invention are PVdF (poly vinylidene fluoride) homopolymer, for example Kynar® or Solef®, Ethylene-chlorotrifluoroethylene copolymer (Halar) or Ethylene-chlorotrifluoroethylene terpolymer with n-butyl acrylate; terpolymers of Vinyl Fluoride/Chloride; Vinylidene Fluoride/Chloride; Hexafluoropropylene, Chlorotrifluoroethlyene, Tetrafluoroethylene.

Most preferably, the polymer is halar, or poly (ethylene chlorotrifluoroethylene), a 1:1 alternating copolymer of ethylene and chlorotrifluoroethylene, and having the following structure:

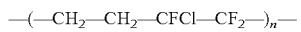

Alternatively, any polymer resistant to base attack containing or formed from and miscible with one or more of the following monomers may be used: chlorotrifluoroethylene vinyl fluoride, vinyl chloride; vinylidene fluoride/vinylidene chloride; hexafluoropropylene, chlorotrifluoroethlyene, tetrafluoroethylene.

Preferably, the activating agent acts to removes HX from the polymer to produce a reactive polymer. Preferably, the activating agent is a base.

Preferably the base is an alkali earth hydroxide, more particularly sodium, potassium, lithium or calcium hydroxide. Alternatively, the base may be an alkali metal alkoxide, such as sodium methoxide, sodium ethoxide, sodium propoxide, potassium methoxide, potassium ethoxide, potassium propoxide and the like. As a further alternative, a strong amine base maybe used, such as tetraethylene pentamine.

Preferably, once in its reactive form, the polymer bears a double bond.

Preferably the reactive coating is a hydrophilic polymer. Most preferably, the reactive coating is PVP.

Preferably, the reactive coating is reacted to the reactive polymer in the presence of an initiator. One preferred initiator is persulfate, $(S_2O_8^{2-})$. Preferably the persulfate is in the form of potassium persulfate, ammonium persulfate, sodium dipersulfate or sodium mono-persulfate.

According to a second aspect, the invention provides a method of hydrophilising a polymer comprising the step of, where applicable modifying the polymer to incorporate a cross linkable functionality and treating said polymer containing a cross linkable functionality with a cross linkable hydrophilising agent, and applying cross linking conditions.

Alternatively, a reactive coating in can be applied to a polymer naturally bearing a cross linkable functionality in the presence of an initiator to hydrophilise the polymer.

Preferably the crosslinkable functionality is a double bond
Preferably the crosslinkable hydrophilising agent is PVP.
Preferably the cross linking conditions involve the use of an initiator and/or cross linking radiation. A preferred initiator is persulfate.

According to a third aspect, the invention provides a method of hydrophilising a halar microfiltration or ultrafiltration membrane comprising the steps of:
i) treating said halar microfiltration or ultrafiltration membrane with a base to eliminate HCl and produce a base treated polymer; and
ii) treating said base treated polymer with PVP in the presence of a cross linking initiator to produce a halar microfiltration or ultrafiltration membrane with a crosslinked surface coating of PVP.

Preferably the initiator is a persulfate anion.

According to a fourth aspect the invention provides a halar microfiltration or ultrafiltration membrane with a crosslinked surface coating of PVP.

Preferably, the membranes of the present invention are asymmetric membranes, which have a large pore face and a small pore face, and a pore size gradient which runs across the membrane cross section. The membranes may be flat sheet, or more preferably, hollow fibre membranes.

According to a fifth aspect, the invention provides a functionalised membrane prepared according to the present invention for use in the microfiltration and ultrafiltration of water and wastewater.

According to a sixth aspect, the invention provides a functionalised membrane prepared according to the present invention for use as an affinity membrane.

According to a seventh aspect, the invention provides a functionalised membrane prepared according to the present invention for use as protein adsorption.

According to an eighth aspect, the invention provides a functionalised membrane prepared according to the present invention for use in processes requiring bio-compatible functionalised membranes.

BEST METHOD OF PERFORMING THE INVENTION

The present invention is disclosed herein with respect to polymeric ultrafiltration membranes or microfiltration membranes. However, it will be appreciated by those skilled in the art that the method can be applied to any appropriate polymeric material where modifications of the kind described are desirable. Any article prepared from a suitable polymer may be hydrophilised in accordance with the present invention.

As mentioned above, the present invention can be carried out upon any polymeric microfiltration or ultrafiltration membrane which bears at least one X group; and may be a wholly or partially halogenated homopolymer, copolymer or terpolymer, one or more wholly or partially halogenated homopolymers, copolymers or terpolymers, or a blend of one or more wholly or partially halogenated homopolymers, copolymers or terpolymers with any miscible non-halogenated polymer, polymer blend or polymer mixture.

Specific examples of halogenated polymers suitable for use in the present invention are PVdF (poly vinylidene fluoride) homopolymer, for example Kynar®, Solef®, Ethylene-chlorotrifluoroethylene copolymer (Halar) or Ethylene-chlorotrifluoroethylene terpolymer with n-butyl acrylate (Halar XPM2); terpolymers of Vinyl Fluoride/Chloride; Vinylidene Fluoride/Chloride; Hexafluoropropylene, Chlorotrifluoroethylene, Tetrafluoroethylene.

The present invention will be described with particular reference to halar, the most preferred compound of the present invention. Halar is a 1:1 alternating copolymer of ethylene-chlorotrifluoroethylene copolymer.

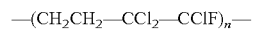

Halar membranes in the form of hollow fibres were prepared according to the method disclosed in PCT AU94/00198 (WO 94/17204) and AU 653528, the contents of which are incorporated herein by reference. Halar membranes used in the experiment were either microfiltration (MF) membranes (nominal pore size=0.1 μm) or ultrafiltration (UF) membranes (nominal pore size=0.01 μm). The polymer, halar, used for both membrane types was identical.

A halar membrane with PVP bound to the surface was prepared. In order to do this, opportunities for a reaction between PVP and otherwise inert halar polymer first needed to be created. The first step in the process was carried out by treatment of halar with a concentrated solution of sodium hydroxide to generate double bonds (via dehydrohalogenation) on the membrane surface that can react with radicals.

The elimination of HX, which in the case of halar is HCl, was more specifically carried out by treating a preformed polymeric ultrafiltration or microfiltration membrane with a 20 wt % caustic solution at 80-120° C. for a period of between 30 minutes and 4 hours. The membrane was then removed from the caustic solution and rinsed with water for 1-2 hours, until the pH of the solution was neutral. The fibres underwent a colour change from white to dark beige/brown during the caustic treatment, known from experience to be evidence that double bonds are forming.

The effect of the length of exposure to caustic solution was investigated and it was established that fibres treated for two hours or longer in caustic were wetting in water after post treatment.

The conditions for successful modification of the halar membrane were found to be unexpectedly mild. Halar UF membranes could be successfully made hydrophilic by initial treatment of the membrane with 30 wt % caustic at 40° C. for 168 hrs (7 days), followed by a treatment of the membrane with PVP at 40° C. for 2 hours. The reaction was accelerated by using higher temperatures, but the permeability was detrimentally affected in the case of UF membranes.

Once the caustic treatment was performed, the membrane is then allowed to react with PVP and free radicals arising from an initiator such as persulfate.

Modified membranes prepared according to the present invention suffer minimal loss of properties. Hydraulic/mechanical properties and chemical resistance appear largely unaffected. Initial non-optimised samples tested for Virus rejection gave LRV >3.5.

In use, halar membranes are likely to be exposed to high concentrations of oxidisers like chlorine and ozone. These oxidising agents can provide satisfactory cleaning of the membrane well but are also known to degrade PVP, and can eliminate any advantage in those prior art systems where the PVP is not bound to the membrane.

Binding the coating to the membrane surface in accordance with the present invention improves the resistance of the hydrophilic layer to oxidation. Even when the coating is partially oxidised, it appears that fragments of hydrophilising polymer remain bound to the surface, beneficially affecting the anti-fouling characteristic of the membrane.

Experimental, Results & Discussion

All of the experiments had the same general procedure of caustic treatment with subsequent surface modification as set out below. All percentages are by weight.

1. Wetting with ethanol (if fibres are not already stored in water) (0.5 hr)
2. Water wash (0.5 hr)
3. Soak in concentrated NaOH solution (0.5 hr)
4. NaOH treatment at elevated temperature for various lengths of time
5. Water wash (2-3 hrs)
6. Soak in PVP/Persulfate solution (1-2 hr)
7. Treatment at elevated temperature (1-2 hr) in 100% humid atmosphere
8. Water wash (>2 hrs)
9. Soak in 20% Glycerol
MF Fibres The reactions were initially carried out on microfiltration membranes with a pore size of 0.1 µm. Samples were exposed to a 20% caustic solution at a temperature of 90° C. for 21 hrs (overnight). The treatment was otherwise as above with the exception that all fibres were washed in ethanol for 3 hrs immediately after treatment with persulfate.

Control #1 was a completely untreated sample. Control #2 was a sample exposed only to the persulfate treatment only. Control #3 had no PVP included; the persulfate treatment consisted of initiator alone.

Membrane samples were initially white and turned brown on caustic treatment. Treatment with persulfate/PVP treatment caused a colour change from brown to light beige.

TABLE 1

| | MF Experiments | | | | | | |
|---|---|---|---|---|---|---|---|
| | Control #1 | Control #2 | Control #3 | a | b | c | d |
| OD | 650 | 650 | 650 | 650 | 650 | 650 | 650 |
| ID | 310 | 310 | 310 | 310 | 310 | 310 | 310 |
| NaOH % | | | 20 | 20 | 20 | 20 | 20 |
| Oven temp (° C.) | | | 90 | 90 | 90 | 90 | 90 |
| Time in Caustic (hr) | | | 18 | 18 | 18 | 18 | 18 |
| Persulfate (%) | | 5 | 5 | 5 | 5 | 5 | 5 |
| H2SO4 (%) | | 0.1 | 0.1 | 0.1 | 0.1 | 0.1 | 0.1 |
| PVP (%) | | 0.5 | | 1 | 0.5 | 0.35 | 0.1 |
| PVP-VA (%) | | 0.5 | | 1 | 0.5 | 0.35 | 0.1 |
| Total Modifier (%) | | 1 | 0 | 2 | 1 | 0.7 | 0.2 |
| Time in Persulfate (hr) | | 18 | 18 | 18 | 18 | 18 | 18 |
| Oven temp (° C.) | | 90 | 90 | 90 | 90 | 90 | 90 |
| Time in Oven (hr) | | 2 | 2 | 2 | 2 | 2 | 2 |
| Time Washing (hr) | | 4 | 4 | 4 | 4 | 4 | 4 |
| Hydrophilic (Y/N)? | N | N | N | Y | Y | Y | Y |
| Permeability (lmh/bar) | 1487 | 0 | 0 | 517 | 1565 | 1473 | 1932 |

The permeability of the samples was evaluated as-is. Apart from control 1, which was wet with ethanol, the samples were wet only with water.

All samples treated with both caustic and PVP/Persulfate became clearly hydrophilic, as a permeability for treated samples could be obtained.

Given that the permeability of the samples with a PVP or PVP/VA concentration of ≦1% (b-d) have a permeability at least equal to the untreated sample (Control #1), the MF membrane porosity is affected by concentrations greater than this. The permeability of the membrane with the lowest concentration of PVP (d) is also similar to the control. This indicates that concentrations as low as 0.2% PVP are sufficient to impart hydrophilicity to the membrane.

It is clear from Control #3 that the absence of PVP prevents the membrane from becoming hydrophilic, despite receiving an otherwise identical treatment. Thus it can be concluded that the PVP is required to generate hydrophilicity.

Surprisingly however, Control #2 was not hydrophilic. This suggests that at least for Halar membranes, it is necessary to graft the PVP to the membrane for any permanency of the treatment. Even if the treatment had caused a hydrophilic coating of the membrane, washing the membranes with ethanol may be the reason for the apparent lack of hydrophilicity in the test. Any unbound PVP would wash away in ethanol, particularly in these low concentrations (0.5%).

These experiments were repeated successfully with various different types of PVP. A number of types of PVP, including K15, K30, K90, K120 and PVP-VA (S630) successfully produced a hydrophilic fibre, a with similar results.

However PVP K15 produced the best results in terms of minimal gel formation and evenness of coverage. K15 can be dissolved into water relatively easily without clumping, and does not greatly affect the viscosity of the solution.

UF Fibres

Once it was established from MF fibres that the treatment was successful, it was applied to UF fibres which typically have even smaller pores. A number of attempts were made using identical parameters and the membranes repeatedly became hydrophilic under identical conditions to the MF fibres.

However, using the same conditions as used to successfully coat MF membranes, it was found that UF membranes lost a significant amount, up to 70 to 80%, of their inherent permeability. Without wishing to be bound by theory, it is believed that this was due to the double bond density achieved at the membrane surface being not sufficiently high. In order to increase double bond density, a variety of temperatures, times and concentrations were investigated. It was found possible, and most desirable, to increase double bond density by increasing the concentration of caustic and the contact times, rather than increasing temperature.

The shortest exposure time possible is the most economic but lower concentrations are better for mass transfer as caustic solutions become more viscous with increasing concentration. There are also safety concerns involved. Around 20% to 30% caustic at 40° C. for varying lengths of time was found to be suitable.

The remainder of the treatment was unchanged, except that the temperature at which the persulfate treatment was performed was decreased to 40° C. in line with the temperature of the caustic treatment. The details of the experiments performed are set out in table 2.

TABLE 2

UF Results

|  | Control | 1b 2 | 1c 3 | 1e 5 | 2a 7 | 2a 7 |
|---|---|---|---|---|---|---|
| OD | 1050 | 1050 | 1050 | 1050 | 1050 | 1050 |
| ID | 622 | 622 | 622 | 622 | 622 | 622 |
| NaOH (%) |  | 20 | 20 | 20 | 30 | 30 |
| Oven Temp (° C.) |  | 40 | 40 | 40 | 40 | 40 |
| Time in Caustic (hr) |  | 95 | 120 | 168 | 72 | 72 |
| Persulfate (%) |  | 5 | 5 | 5 | 5 | 5 |
| $H_2SO_4$ (%) |  | 0.1 | 0.1 | 0.1 | 0.1 | 0.1 |
| PVP K15 (%) |  | 0.5 | 0.5 | 0.5 | 0.5 | 0.5 |
| Total Modifier (%) |  | 0.5 | 0.5 | 0.5 | 0.5 | 0.5 |
| Time in Persulfate (hr) |  | 1 | 1 | 2 | 1 | 1 |
| Time in oven (hr) |  | 1.5 | 1.5 | 1.5 | 1.5 | 1.5 |
| Oven temp (° C.) |  | 40 | 40 | 40 | 40 | 40 |
| Time (hr) Washing |  | 17 | 0.5 | 2 | 17 | 17 |
| Time (hr) in 20% glycerol |  | 2 | 2 | 17 | 2 | 2 |
| Hydrophilic (Y/N)? | N | N | N | N | Y | EtOH |
| Permeability (lmh/bar) | 147 | 82 | 123 | 69 | 33 | 68 |
| % Of Ethanol permeability |  |  |  |  | 49% |  |

|  | Control | 2b 8 | 2b 8 | 2c 9 | 2c 9 | 2d 10 | 2d 10 |
|---|---|---|---|---|---|---|---|
| OD | 1050 | 1050 | 1050 | 1050 | 1050 | 1050 | 1050 |
| ID | 622 | 622 | 622 | 622 | 622 | 622 | 622 |
| NaOH (%) |  | 30 | 30 | 30 | 30 | 30 | 30 |
| Oven Temp (° C.) |  | 40 | 40 | 40 | 40 | 40 | 40 |
| Time in Caustic (hr) |  | 96 | 96 | 144 | 144 | 168 | 168 |
| Persulfate (%) |  | 5 | 5 | 5 | 5 | 5 | 5 |
| $H_2SO_4$ (%) |  | 0.1 | 0.1 | 0.1 | 0.1 | 0.1 | 0.1 |
| PVP K15 (%) |  | 0.5 | 0.5 | 0.5 | 0.5 | 0.5 | 0.5 |
| Total Modifier (%) |  | 0.5 | 0.5 | 0.5 | 0.5 | 0.5 | 0.5 |
| Time in Persulfate (hr) |  | 1 | 1 | 2 | 2 | 2 | 2 |
| Time in oven (hr) |  | 1.5 | 1.5 | 1.5 | 1.5 | 1.5 | 1.5 |
| Oven temp (° C.) |  | 40 | 40 | 40 | 40 | 40 | 40 |
| Time (hr) Washing |  | 0.5 | 0.5 | 2 | 2 | 2 | 2 |
| Time (hr) in 20% glycerol |  | 2 | 2 | 2 | 2 | 2 | 2 |
| Hydrophilic (Y/N)? | N | Y | EtOH | Y | EtOH | Y | EtOH |

TABLE 2-continued

| | UF Results | | | | | | |
|---|---|---|---|---|---|---|---|
| Permeability (lmh/bar) | 147 | 52 | 82 | 98 | 121 | 71 | 80 |
| % Of Ethanol permeability | | 64% | | 81% | | 88% | |

The samples that were treated with 20% caustic showed a significantly lighter colour than those treated with 30% caustic for the same period of time. This is a clear indication that the surface double bond density has increased by increasing caustic concentration.

This is also supported by the results for hydrophilicity. Samples 1a-1e received the same treatment times as 2a-2e, but the results are dramatically different. None of the series 1a-1e were hydrophilic, while the series 2a-2e had varying degrees of hydrophilicity.

The permeability of samples 2a-2e was measured before and after wetting with ethanol to assess whether any deviation was due to pore collapse or non-wetting.

Presuming the membrane had neither collapsed nor suffered from plugged pores (which should be evident in all samples) the maximum available permeability of a specific fibre sample should be related (within the normal margins of error) to the permeability after wetting thoroughly with ethanol. Therefore a relationship should be observed by plotting the % of total permeability available (ethanol wet) that was obtained by wetting with water, versus the time exposed to caustic, and in fact a very clear relationship exists between the length of time in 30% caustic and the water-wet permeability (hydrophilicity) as a proportion of the total permeability (ethanol-wet).

The longer a sample was exposed to 30% caustic at 40° C. before PVP treatment, the more hydrophilic the final membranes were. This supports the theory for increasing surface double bond density of the membrane.

Even more importantly, the permeability of sample 2e is approximately 90% of the available permeability, close enough to the available permeability of the sample (within experimental error) to be considered fully hydrophilic.

While the invention has been described with reference to particular embodiments, it will be understood by those skilled in the art that the inventive concept disclosed herein is not limited only to those specific embodiments disclosed.

The invention claimed is:

1. A method of making a hydrophilic asymmetric membrane comprising:
   forming an activated asymmetric membrane by exposing a surface of an asymmetric membrane comprising poly(ethylene chlorotrifluoroethylene) to an activating agent under conditions suitable for generating a reactive surface on the asymmetric membrane; and
   forming a hydrophilic asymmetric membrane by reacting a reactive coating on the surface of the activated asymmetric membrane.

2. The method of claim 1, wherein forming the asymmetric membrane comprising poly(ethylene chlorotrifluoroethylene) occurs prior to forming an activated asymmetric membrane.

3. The method of claim 2, wherein forming the asymmetric membrane comprises diffusion induced phase separation.

4. The method of claim 2, wherein forming the asymmetric membrane comprises thermally induced phase separation.

5. The method of claim 1, wherein forming a hydrophilic asymmetric membrane by reacting the reactive coating with the activated asymmetric membrane occurs in the presence of an initiator.

6. The method of claim 1, wherein forming the activated asymmetric membrane occurs by exposing the surface of the asymmetric membrane with an activating agent comprising an alkali earth hydroxide.

7. The method of claim 1, wherein forming the activated asymmetric membrane occurs by exposing the surface of the asymmetric membrane with an activating agent comprising an alkali metal alkoxide.

8. The method of claim 1, wherein the reactive coating is polyvinylpyrrolidone.

9. The method of claim 1, wherein the activating agent comprises a solution of about 20 wt % to about 30 wt % sodium hydroxide.

10. The method of claim 1, wherein forming the activated asymmetric membrane by exposing the surface of the asymmetric membrane to the activating agent occurs for a length of time suitable for forming the reactive surface.

11. The method of claim 1, wherein forming the activated asymmetric membrane by exposing the surface of the asymmetric membrane to the activating agent occurs at a temperature suitable for forming the reactive surface.

12. The method of claim 1, wherein forming the hydrophilic asymmetric membrane by reacting the reactive coating with the activated asymmetric membrane occurs under conditions suitable for crosslinking the reactive coating to the activated asymmetric membrane.

13. The method of claim 12, wherein forming the hydrophilic asymmetric membrane by reacting the reactive coating with the activated asymmetric membrane occurs for a length of time suitable for forming the hydrophilic asymmetric membrane.

14. The method of claim 12, wherein forming the hydrophilic asymmetric membrane by reacting the reactive coating with the activated asymmetric membrane occurs at a temperature suitable for forming the hydrophilic asymmetric membrane.

15. A hydrophilic asymmetric membrane comprising:
   an asymmetric membrane comprising poly(ethylene chlorotrifluoroethylene); and
   a hydrophilic coating comprising polyvinylpyrrolidone (PVP) crosslinked to a surface of the asymmetric membrane.

16. The hydrophilic asymmetric membrane of claim 15 further comprising a nominal pore size of about 0.1 μm.

17. The hydrophilic asymmetric membrane of claim 15 further comprising a nominal pore size of about 0.01 μm.

18. The hydrophilic asymmetric membrane of claim 15, wherein the membrane is in the form of a flat sheet membrane.

19. The hydrophilic asymmetric membrane of claim 15, wherein the membrane is in the form of a hollow fiber membrane.

* * * * *